United States Patent Office 3,574,857
Patented Apr. 13, 1971

3,574,857
ANTILIPIDEMIC METHODS USING GLUTAMIC ACID, THREONINE AND PROLINE
William H. Cevallos, Devon, Pa., assignor to Smith Kline & French Laboratories, Philadelphia, Pa.
No Drawing. Filed Apr. 1, 1968, Ser. No. 717,943
Int. Cl. A61k 27/00
U.S. Cl. 424—319                                5 Claims

ABSTRACT OF THE DISCLOSURE

Methods of producing hypolipidemic activity in subjects having abnormally high levels of lipids (cholesterol) in the blood stream using a combination of glutamic acid and threonine administered internally in quantities greater than present in the suject's normal diet. Proline may also be added.

---

This invention relates to a method of inducing a hypocholesterolemic effect in subjects suffering from abnormally high cholesterol levels in their plasma and to compositions useful for this method.

Abnormally high lipid, especially cholesterol, levels in the plasma have been ascribed a major contributing factor to the formation of arteriosclerosis by many medical groups such as reported by the American Heart Association in 1965 and by various reports of the National Institutes of Health. Several chemical compounds have been demonstrated cholesterol lowering or hypolipidemic activity such as nicotinic acid, sodium dextrothyroxine, sitosterol, cholestyramine and clofibrate. Indications for dextrothyroxine and clofibrate, for example, are listed in Modern Drugs, 1967, pages 265 and 267.

In the search for hypolipidemic agents, it has been repeatedly reported that sulfur-containing amino acids, such as taurine, ethionine and especially methionine, reduce excessive cholesterolemia while non-sulfur amino acid was reported to be inactive. Also U.S. No. 2,965,542 describes the use of five α-amino acids to give hypolipidemic effects but the use of the amino acid combination hereafter described is not disclosed. I have now found that a combination of glutamic acid and threonine, two naturally occurring amino acids which are sulfur-free, functions as a hypolipidemic agent when administered internally, either orally or parenterally, to animals in amounts greater than those in the normal diet. An equivalent amount of either amino acid alone does not give a statistically significant effect.

Additionally, I have found that combinations of glutamic acid, threonine and proline as well as glutamic acid, threonine, proline, alanine and glycine also have similar significant hypolipidemic effects in animals. The three acid combination is especially preferred since it gives hypolipidemic effects equivalent to the five-component mixture.

It is recognized by those skilled in the art that measurements of the cholesterol level of the plasma and of the liver of test animals are both significant criteria of hypolipidemic activity. Since the liver is the site of the catabolism of cholesterol, lowering the cholesterol level of the liver is of great significance in treating hypercholesterolemia.

The experimental results listed hereafter use methods reported by several prior investigators such as Viviani, R., et al., Experientia, 19, 188 (1963). The latter investigator also recommended the rat as the ideal test animal for correlation with hypocholesterolemic effects in man. The following results are derived from an acute test procedure using groups of seven Charles River rats of average weight about 100 gms. which have been maintained on a diet of standard laboratory rat ration (Purina) supplemented by 10% corn oil in which the test materials are administered intraperitoneally dissolved in saline. In the tests reported in Table I, a total of 3.6 mg./kg. of total amino acid was used in each case comprised of equivalent proportions of the individual amino acid. The animals are sacrificed four hours after administration; the individual livers and plasma are then assayed and averaged.

TABLE I

| Group | Plasma cholesterol | | | Liver cholesterol | | |
|---|---|---|---|---|---|---|
| | Mg., percent | Δ mg., percent | Percent from control | Mg./ gm. | Δ mg./ gm. | Percent from control |
| Control | 58.35 | | | 2.30 | | |
| Glutamic, theonine, proline, alanine, glycine | 40.76 | a—17.59 | a—30.1 | 1.75 | a—0.55 | a—23.9 |
| Glutamic acid | 49.89 | —8.47 | —14.4 | 2.05 | —0.25 | —10.8 |
| Threonine | 54.10 | —4.25 | —7.2 | 1.99 | —0.31 | —13.4 |
| Glutamic, threonine | 47.10 | a—11.25 | a—19.2 | 1.83 | a 0.48 | a—20.8 |
| Glutamic, threonine, proline | 41.27 | a—17.08 | a—29.2 | 1.70 | a—0.60 | a—26.0 |
| Alanine, proline | 52.67 | —9.19 | —14.8 | 1.88 | —0.27 | —12.5 | a Statistically significant, P=0.5.
NOTE.—All at 0.5 mg./kg. of nitrogen content or 3.6 mg./kg. of amino acid.

TABLE II

| Group | Plasma cholesterol | | | Liver cholesterol | | |
|---|---|---|---|---|---|---|
| | Mg., percent | Δ mg., percent | Percent from control | Mg./ gm. | Δ mg./ gm. | Percent from control |
| Control | 71 | | | 3.23 | | |
| 5 amino acids: 4.0 mg./kg. of N | a 58.0 | a—13.0 | a—18.3 | 2.81 | a—0.42 | a—13 |
| 3 amino acids: | | | | | | |
| 4.0 mg./kg | 59.3 | a—10.8 | a—15.2 | 2.43 | a—0.83 | a—25.4 |
| 2.0 mg./kg | 62.3 | —12.3 | —8.7 | 2.67 | a—0.56 | a—17.3 |
| 1.0 mg./kg | 63.1 | —7.9 | —11.1 | —2.59 | a—0.64 | a—19.8 |
| 0.5 mg./kg | 65.8 | —5.2 | —7.32 | —2.63 | a—0.60 | a—18.6 | a Significant effects.

From these data it is apparent that significant hypolipidemic effects are found with the combinations of amino acids previously outlined with positive cholesterol lowering effects range over a wide scale. For practical purposes, from about 2–50 preferably about 5–40 mg./kg. of total amino acid content, in excess of the normal diet, is a useful range. Once again, the quantity of the amino acid combination is as given in total acid content with equivalent amounts of the individual acids.

In a long-range test the preferred three as well as the five amino acid mixtures gave positive cholesterol lowering activities upon oral administration of 50 mg./kg. total amino acids in equal proportions twice a day for 10 days to groups of 8 Carworth rats of average weight 72 gms. on a diet of standard rat ration (Purina) supplemented with 10% corn oil. The rats were then sacrificed and their plasma and liver levels assayed by standard methods.

TABLE III

| Group | Plasma cholesterol | | | Liver cholesterol | | |
|---|---|---|---|---|---|---|
| | Mg., percent | Δ mg. percent | Percent from control | Mg./ gm. | Δ mg./ gm. | Percent from control |
| Control | 73.6 | | | 3.1 | | |
| 5 amino acids | 59.4 | a−14.2 | a−19.3 | 2.3 | a−0.8 | a−25.8 |
| 3 amino acids | 59.1 | a−14.5 | a−19.7 | 2.2 | a−0.9 | a−21.0 | a Significant effects.

This invention therefore comprises the method of producing hypolipidemic (or hypocholesterolemic) effects in hyperlipidemic (or hypercholesterolemic) animals comprising administering internally, preferably orally, an effective but nontoxic quantity of glutamic acid and threonine. The effective amounts of the amino acid combination are in excess of the normal diet levels of the subject animal derived from protein metabolism. Especially preferred is internal administration of a hypolipidemically effective quantity of glutamic acid, threonine and proline. The method of this invention, for example, may comprise administration of about 2–50 mg./kg., preferably about 5–40 mg./kg. of the total amino acid mixture, for convenience sake often comprised of substantially equivalent amounts of the individual amino acid components. The daily requirements should total about 1–8 grams daily for the average weight subject.

In practical terms the two, three or five amino acid mixtures may be made up in about 100–500 mg., preferably 200–350, dosage units for an average subject of 70 kg. weight such as in tablets, capsules, lozenges, troches, or sterile parenteral preparations, for example, in saline solution. These unit dosages are then administered internally, preferably orally, as many times per day as may be effective without toxicity, such as from 2–10 times daily, to a hypercholesterolemic subject.

The dosage units will contain the active amino acid ingredients usually in substantially equivalent amounts optionally combined with a standard pharmaceutical carrier. However, the proportions of ingredients may be varied for example according to the cost of the ingredients without affecting the biological activity of the mixture by retaining a biologically significant quantity of each of the two essential ingredients, glutamic acid and threonine.

Since the individual ingredients of this invention are naturally occurring amino acids, toxicity is not a serious problem. In fact, no toxic side effects were observed in my study. It will be clear to those skilled in the art that the hypolipidemically effective amounts of the amino acid combinations of this invention are much greater than those occurring naturally in the diet. For example, the range of normal requirements for the essential amino acid, threonine, for a normal man derived from protein is 0.30–0.50 g. per day while my experiments show substantial added amounts of threonine alone do not have a hypocholesterolemic effect. The claimed amino acid compositions therefore will be used in addition to the normal protein intake of the subject and will consist of free amino acids usually in the naturally occurring isomeric form, not protein polypeptides. Glutamic acid and proline, the other two amino acids of the preferred combination of this invention, while naturally occurring are classified as amino acids which are non-essential to life.

The pharmaceutical dosage units containing the combination of amino acids may be prepared by standard methods in manufacturing pharmacy. For example, as noted the unit may be a tablet, capsule, lozenge, sublingual tablet, troche, aqueous suspension or solution or a sterile parenteral solution. Such are prepared by standard pharmaceutical procedures.

EXAMPLE 1

A mixture of 100 mg. each of threonine and glutamic acid is mixed with 100 mg. of lactose, screened and filled into a hard gelatin capsule. These capsules containing 200 mg. of amino acid each are then administered orally 6 times daily to a hypercholesterolemic subject of 70 kg. weight.

EXAMPLE 2

A mixture of 50 mg. each of threonine, glutamic acid and proline are dissolved in saline, passed through a microfilter for sterilization and filled into a sterile ampule. Such are injected parenterally to a 70 kg. weight hypercholesterolemic subject several times daily.

What is claimed is:

1. The method of producing antilipidemic activity in a hyperlipidemic subject comprising administering orally to said subject a combination of substantially equal amounts of glutamic acid and threonine in a hypolipidemically effective but nontoxic total quantity of from about 2–50 mg./kg. such quantity being in excess of the normal ingestion of said glutamic acid and threonine in the diet of said subject.

2. The method of claim 1 in which proline is added to glutamic acid and threonine and the three amino acids being present in substantially equal amounts with a total of from about 2–50 mg./kg.

3. The method of claim 1 in which the daily dosage of the combination used is about 1–8 grams daily.

4. The method of claim 2 in which the total amino acid content of the combination used is from about 1–8 grams daily.

5. The method of claim 2 in which alanine and glycine are added to the combination.

References Cited

UNITED STATES PATENTS 2,411,897  12/1946  Sahyum _____ 424—319
2,965,542  12/1960  Castaigne _____ 424—319
3,152,955  10/1964  Gow et al. _____ 424—319

STANLEY J. FRIEDMAN, Primary Examiner